(12) United States Patent
Clement et al.

(10) Patent No.: US 10,636,222 B2
(45) Date of Patent: Apr. 28, 2020

(54) AVATARS IN VIRTUAL ENVIRONMENTS

(71) Applicant: GOOGLE INC., Mountain View, CA (US)

(72) Inventors: Manuel Christian Clement, Felton, CA (US); Stefan Welker, Mountain View, CA (US); Tim Gleason, Jersey City, NJ (US); Ian MacGillivray, New York, NY (US); Darwin Yamamoto, Brooklyn, NY (US); Shawn Buessing, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 37 days.

(21) Appl. No.: 15/586,628

(22) Filed: May 4, 2017

(65) Prior Publication Data

US 2017/0323489 A1 Nov. 9, 2017

Related U.S. Application Data

(60) Provisional application No. 62/430,180, filed on Dec. 5, 2016, provisional application No. 62/331,939, filed on May 4, 2016.

(51) Int. Cl.

| | |
|---|---|
| *G06T 19/20* | (2011.01) |
| *A63F 13/35* | (2014.01) |
| *A63F 13/335* | (2014.01) |
| *A63F 13/52* | (2014.01) |
| *G06T 3/40* | (2006.01) |
| *G06T 13/40* | (2011.01) |

(Continued)

(52) U.S. Cl.
CPC ............ *G06T 19/20* (2013.01); *A63F 13/335* (2014.09); *A63F 13/35* (2014.09); *A63F 13/52* (2014.09);

(Continued)

(58) Field of Classification Search
CPC . G06T 2200/24; G06T 19/006; G06T 19/003; G06T 19/20; G06T 15/00;

(Continued)

(56) References Cited

U.S. PATENT DOCUMENTS

| | | |
|---|---|---|
| 8,108,774 B2 | 1/2012 | Finn et al. |
| 8,223,156 B2 | 7/2012 | Boss et al. |

(Continued)

OTHER PUBLICATIONS

Pena, et al., "I Am What I See: How Avatar and Opponent Agent Body Size Affects Physical Activity Among Men Playing Exergames", Journal of Computer-Mediated Communication, 2016, 15 pages.

(Continued)

*Primary Examiner* — Phi Hoang
*Assistant Examiner* — Scott E Sonners
(74) *Attorney, Agent, or Firm* — Brake Hughes Bellermann LLP

(57) ABSTRACT

Techniques of generating a virtual environment in a virtual reality system involves changing, within a user interface of the second user, an attribute of an avatar representing the first user while maintaining a spatial position of an object with which the first user is interacting. In this way, the second user may see only non-threatening or otherwise pleasant avatars within their user interface while other users may not perceive any change to the virtual environment as displayed in their respective user interfaces.

17 Claims, 10 Drawing Sheets

(51) Int. Cl.
  *A63F 13/79* (2014.01)
  *G06T 15/20* (2011.01)
(52) U.S. Cl.
  CPC ............... *A63F 13/79* (2014.09); *G06T 3/40* (2013.01); *G06T 13/40* (2013.01); *G06T 15/20* (2013.01); *G06T 2219/024* (2013.01); *G06T 2219/2016* (2013.01); *G06T 2219/2024* (2013.01)
(58) Field of Classification Search
  CPC ... G06T 19/00; G06T 2219/024; G06F 3/011; G06F 3/04815; G06F 3/048; A63F 13/79; A63F 2300/5553; A63F 13/12; A63F 13/52; A63F 2300/308; A63F 2300/8082
  See application file for complete search history.

(56) References Cited

U.S. PATENT DOCUMENTS

| | | | |
|---|---|---|---|
| 8,388,442 | B2 | 3/2013 | Bates et al. |
| 8,648,865 | B2 | 2/2014 | Dawson et al. |
| 2009/0141023 | A1* | 6/2009 | Shuster ............. G06T 3/40 345/419 |
| 2009/0150778 | A1 | 6/2009 | Nicol, II |
| 2010/0045697 | A1 | 2/2010 | Reville et al. |
| 2010/0083140 | A1* | 4/2010 | Dawson ............. A63F 13/12 715/757 |
| 2010/0083148 | A1* | 4/2010 | Finn ............. A63F 13/12 715/764 |
| 2010/0149213 | A1 | 6/2010 | Navab et al. |
| 2010/0220097 | A1 | 9/2010 | Hamilton, II et al. |
| 2016/0019717 | A1 | 1/2016 | Yopp et al. |
| 2016/0063588 | A1* | 3/2016 | Gadre ............. G06Q 30/0623 705/26.61 |

OTHER PUBLICATIONS

International Search Report and Written Opinion received for PCT Patent Application No. PCT/US2017/031015, dated Oct. 2, 2017, 20 pages.

Invitation to Pay Add'l Fees and Partial Search Report from Appn. No. PCT/US2017/031015, dated Aug. 9, 2017, 12 pages.

* cited by examiner

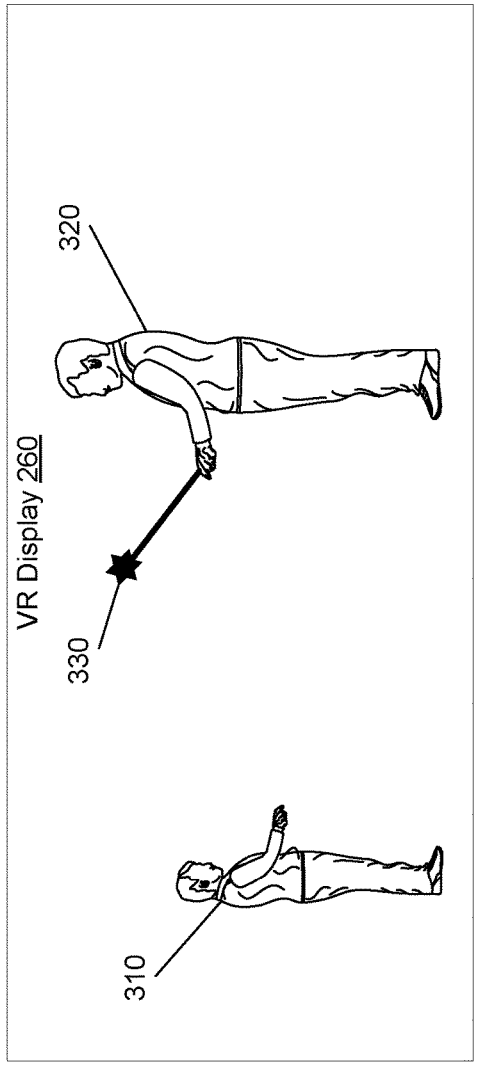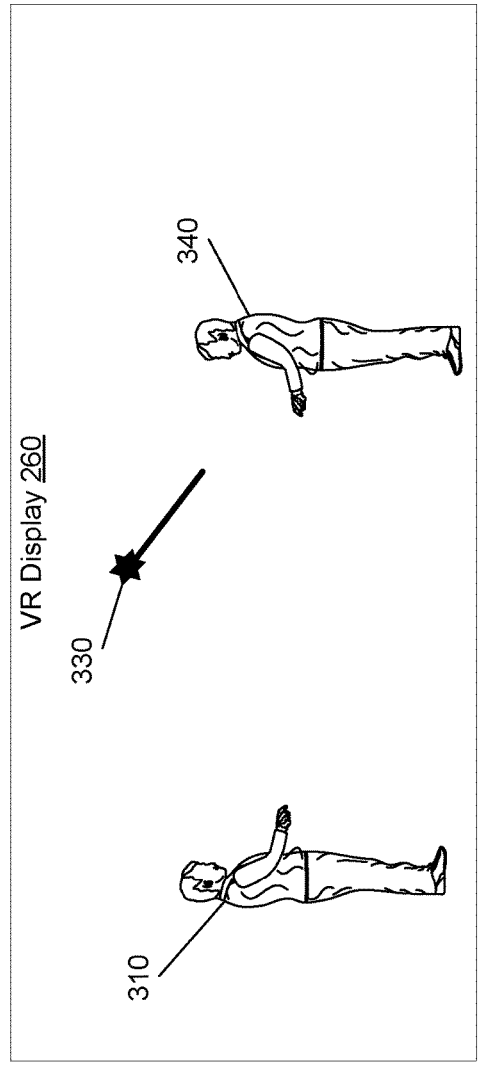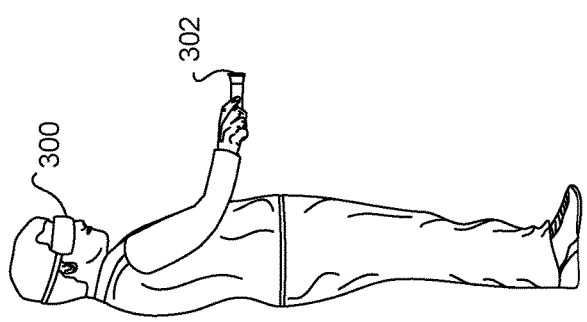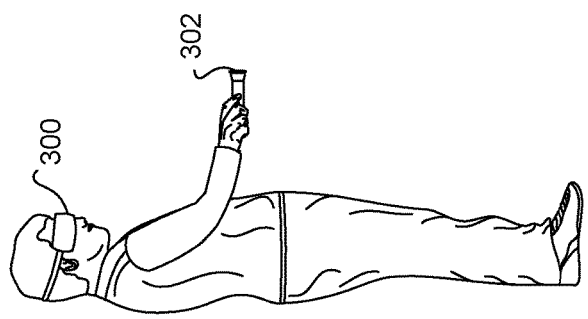
FIG. 3A
FIG. 3B

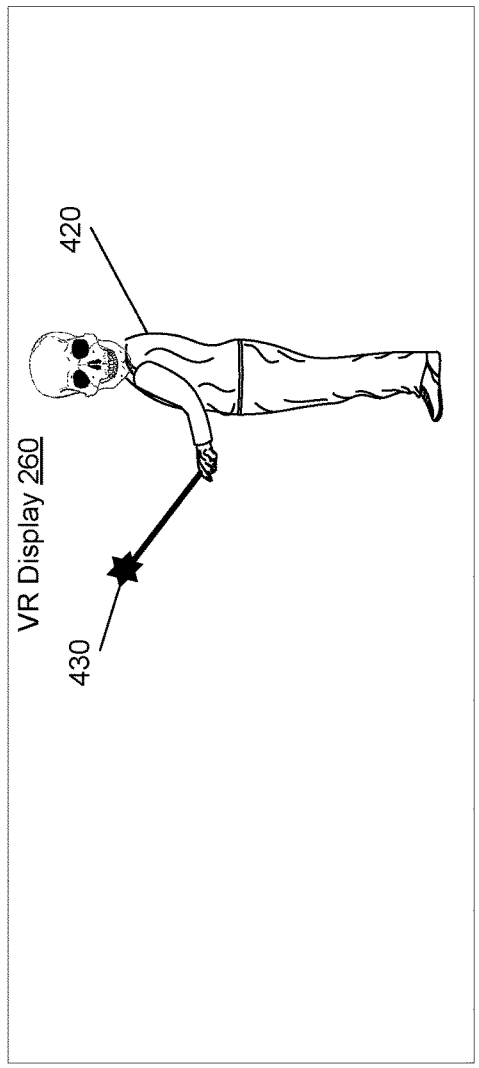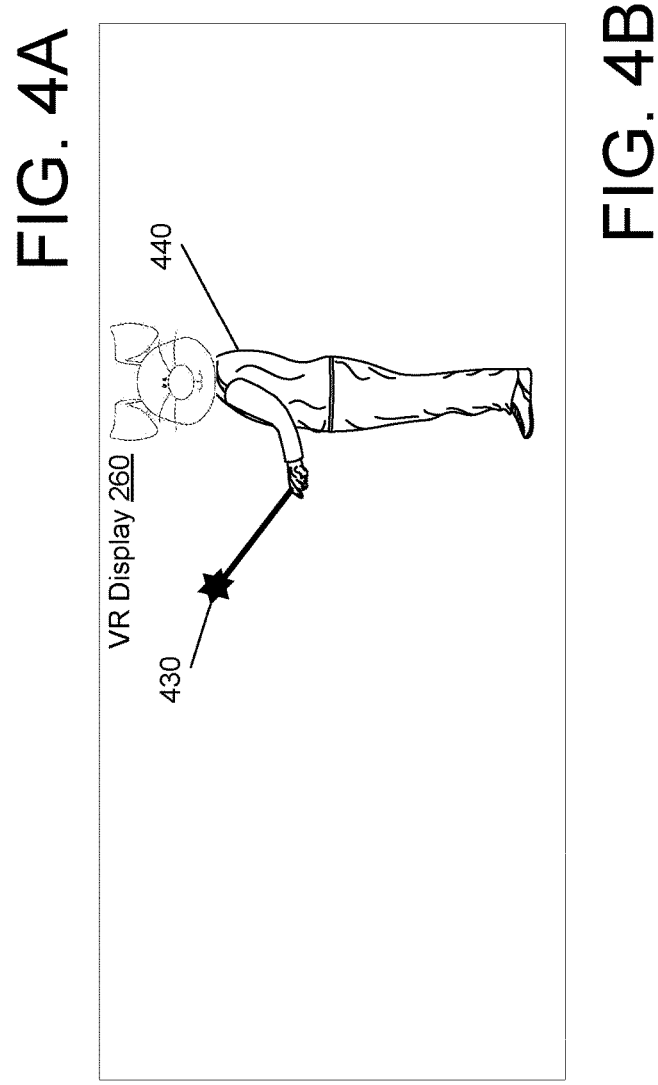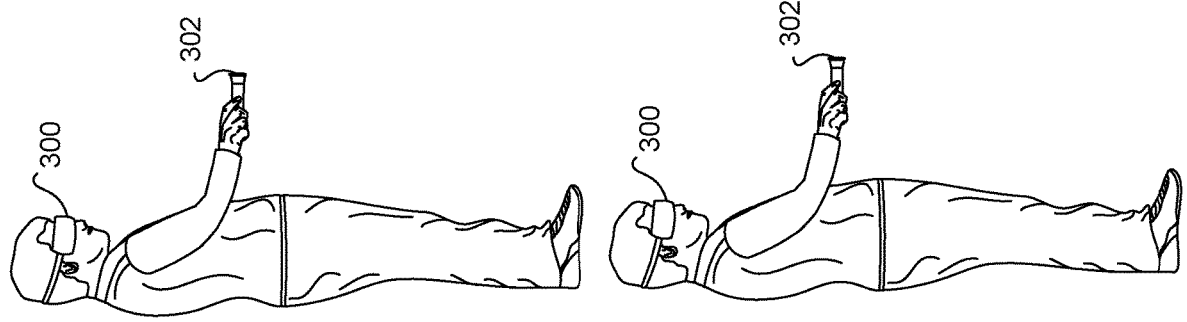

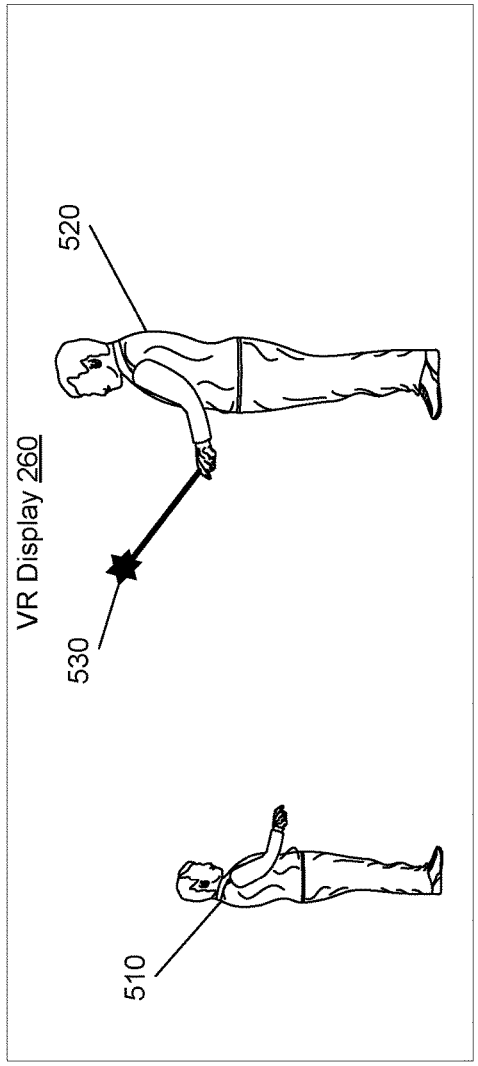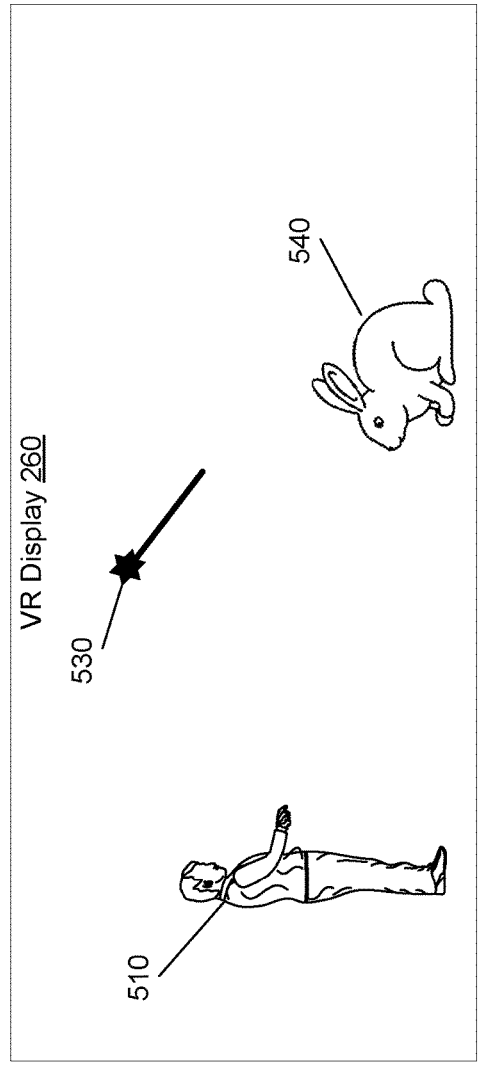

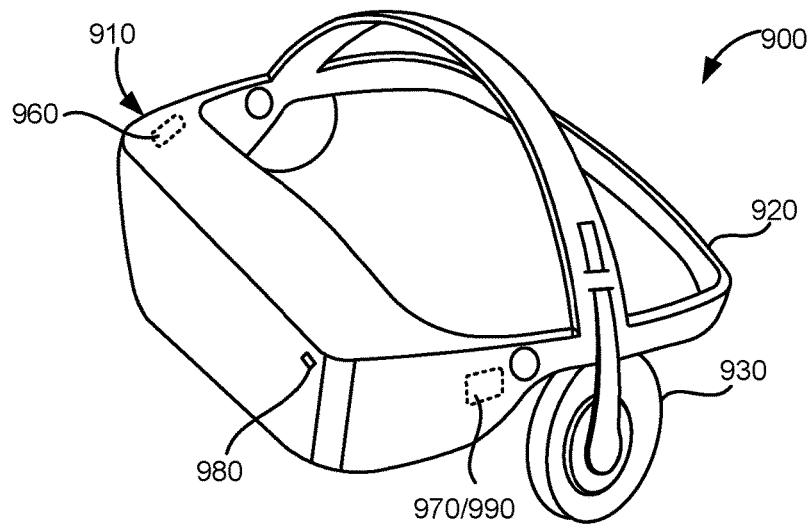
FIG. 10A
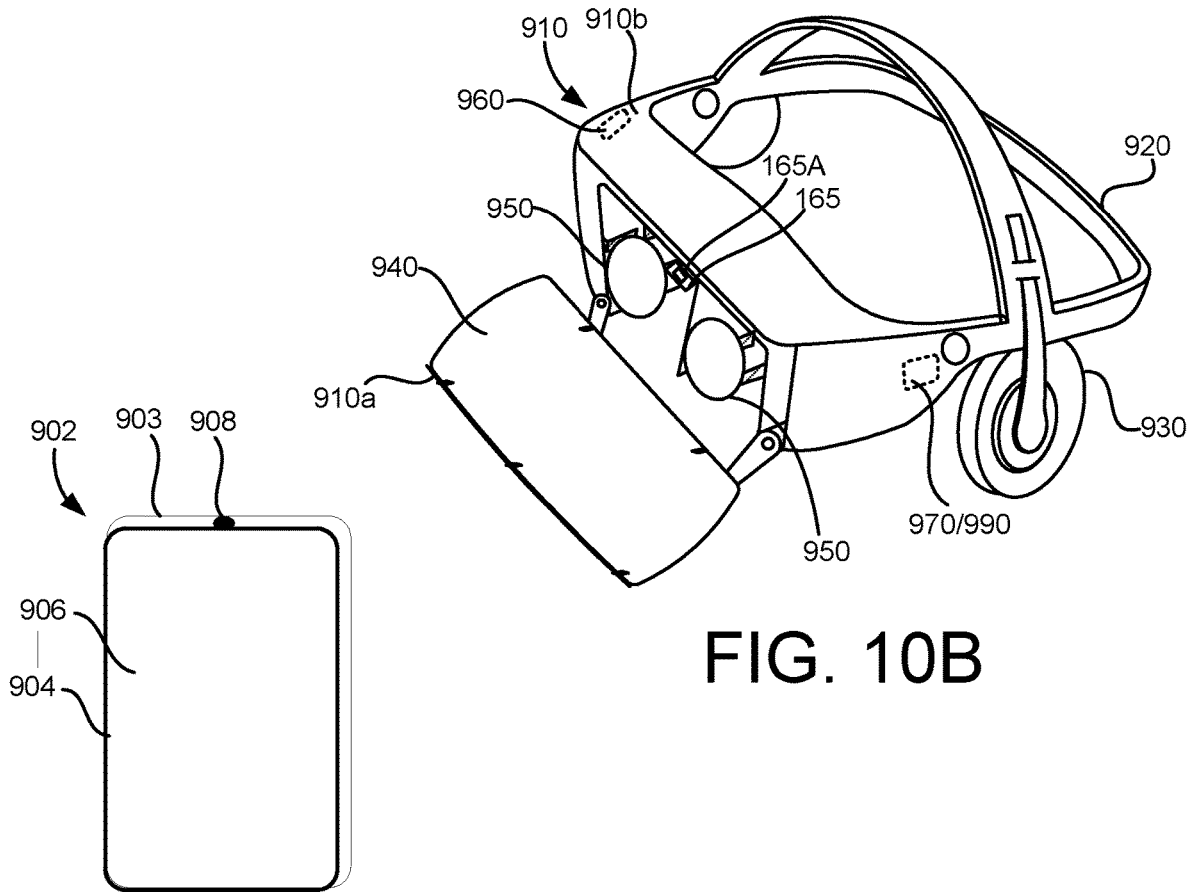
FIG. 10B
FIG. 10C

AVATARS IN VIRTUAL ENVIRONMENTS

CROSS REFERENCE TO RELATED APPLICATION(S)

This application claims priority to U.S. Provisional Application No. 62/331,939, filed on May 4, 2016 and U.S. Provisional Application No. 62/430,180, filed on Dec. 5, 2016, the disclosures of which are incorporated herein by reference.

TECHNICAL FIELD

This description generally relates to representing users in virtual reality (VR) environments.

BRIEF DESCRIPTION OF THE DRAWINGS

FIG. 3A is a diagram depicting an example VR space that includes a pair of avatars.

FIG. 3B is a diagram depicting the example VR space in which one of the avatars has been resized.

FIG. 4A is a diagram depicting an example VR space that includes a pair of avatars.

FIG. 4B is a diagram depicting the example VR space in which one of the avatars has its facial features replaced.

FIG. 5A is a diagram depicting an example VR space that includes a pair of avatars.

FIG. 5B is a diagram depicting the example VR space in which one of the avatars has its appearance changed.

FIGS. 10A, 10B, and 10C are diagrams depicting the example VR HMD and controller.

Like reference symbols in the various drawings indicate like elements.

DETAILED DESCRIPTION

A conventional virtual environment includes avatars representing users. Each avatar representing a respective user is displayed on a display that includes a user interface accessible to that respective user. The user interface allows the respective user to control the actions and appearance of the avatar of the user within the virtual environment. Because the virtual environment includes an avatar representing each user, each user may see other (e.g., all other) avatars in the virtual environment.

However, if one or more of the other avatars appears threatening to a particular user, the particular user may experience negative psychological effects upon participating in the conventional virtual environment. For example, if a user's avatar is much larger than another user's avatar in a game, then the other user may find it difficult to play the game normally in the presence of the larger avatar.

In contrast to the conventional virtual environment in which a first user's avatar may provide an unpleasant experience for a second user, an improved technique involves changing, within a user interface of the second user, an attribute of an avatar representing the first user while maintaining a spatial position of an object with which the first user is interacting. In this way, the second user may avoid seeing images that may interfere with normal usage within their user interface while other users may not perceive any change to the virtual environment as displayed in their respective user interfaces.

Figure 1:
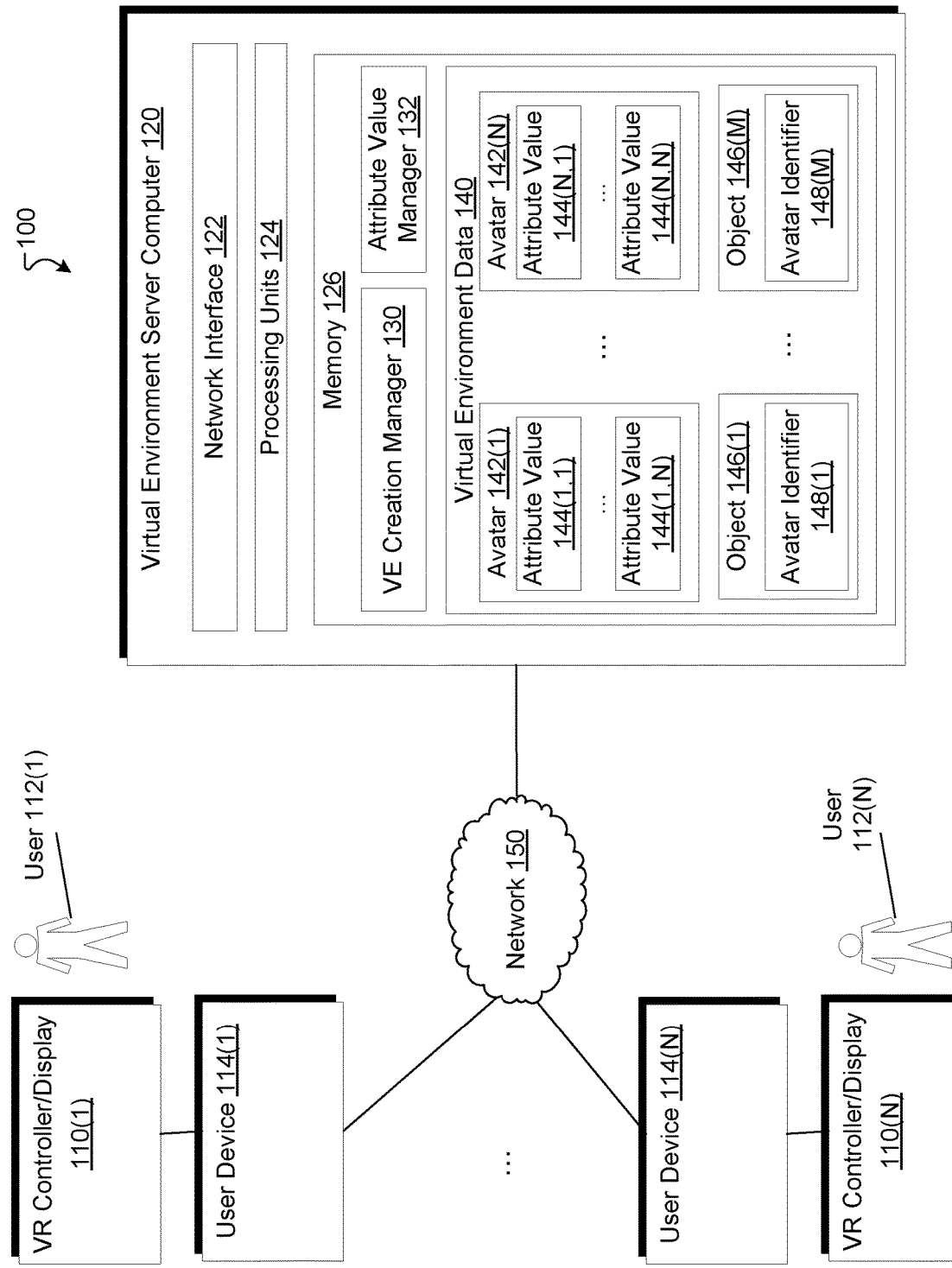
FIG. 1 is a block diagram of an example electronic environment for performing improved techniques of representing users in a virtual reality (VR) space.

FIG. 1 is a block diagram of an example electronic environment 100 for performing one embodiment of the improved techniques of representing users in the VR space. The example electronic environment 100 includes multiple VR controllers 110(1), . . . , 110(N). The example environment 100 also includes a virtual environment (VE) server computer 120 and a network 150.

Each VR controller, e.g., VR controller 110(1) may take the form of a head-mounted display (HMD) which is worn by a respective user 112(1) to provide an immersive virtual environment. In the example electronic environment 100, each user, e.g., user 112(1) that wears the respective VR controller, i.e., VR controller 110(1) holds a respective user device, i.e., user device 114(1). The user device 114(1) may be, for example, a smartphone, a controller, a joystick, or another portable handheld electronic device(s) that may be paired with, and communicate with, the VR controller 110(1) for interaction in the immersive virtual environment. The user device 114(1) may be operably coupled with, or paired with the VR controller 110(1) via, for example, a wired connection, or a wireless connection such as, for example, a WiFi or Bluetooth connection. This pairing, or operable coupling, of the user device 114(1) and the VR controller 110(1) may provide for communication between the user device 114(1) and the VR controller 110(1) and the exchange of data between the user device 114(1) and the VR controller 110(1). This may allow the user device 114(1) to function as a controller in communication with the VR controller 110(1) for interacting in the immersive virtual environment. That is, a manipulation of the user device 114(1), such as, for example, a beam or ray emitted by the user device 114(1) and directed to a virtual object or feature for selection, and/or an input received on a touch surface of the user device 114(1), and/or a movement of the user device 114(1), may be translated into a corresponding selection, or movement, or other type of interaction, in the immersive virtual environment provided by the VR controller 110(1).

In some implementations, the above discussion applies to each VR controller 110(1), . . . , 110(N) and respective user device 114(1), . . . , 114(N).

The virtual environment server computer 120 is configured to generate data 140 for the immersive virtual environment and transmit that data to each of the user devices 114(1), . . . , 114(N) over the network 150. As illustrated in FIG. 1, the virtual environment server computer 120 is implemented as a computer system that is in communication with the user devices 114(1), . . . , 114(N) over the network 150.

In some implementations, the virtual environment server computer 120 can be, for example, a wired device and/or a wireless device (e.g., wi-fi enabled device) and can be, for example, a computing entity (e.g., a personal computing device), a server device (e.g., a web server), a mobile phone, a touchscreen device, a personal digital assistant (PDA), a laptop, a television including, or associated with, one or more processors, a tablet device, e-reader, and/or so forth. Such device(s) can be configured to operate based on one or more platforms (e.g., one or more similar or different platforms) that can include one or more types of hardware, software, firmware, operating systems, runtime libraries, and/or so forth.

The virtual environment server computer 120 includes a network interface 122, a set of processing units 124, and memory 126. The network interface 122 includes, for example, Ethernet adaptors, Token Ring adaptors, and the like, for converting electronic and/or optical signals received from the network 150 to electronic form for use by the virtual environment server computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

The components (e.g., modules, processing units 124) of the virtual environment server computer 120 can be configured to operate based on one or more platforms (e.g., one or more similar or different platforms) that can include one or more types of hardware, software, firmware, operating systems, runtime libraries, and/or so forth. In some implementations, the components of the virtual environment server computer 120 can be configured to operate within a cluster of devices (e.g., a server farm). In such an implementation, the functionality and processing of the components of the virtual environment server computer 120 can be distributed to several devices of the cluster of devices.

The components of the virtual environment server computer 120 can be, or can include, any type of hardware and/or software configured to process attributes. In some implementations, one or more portions of the components shown in the components of the virtual environment server computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the virtual environment server computer 120 can be, or can include, a software module configured for execution by at least one processor (not shown). In some implementations, the functionality of the components can be included in different modules and/or different components than those shown in FIG. 1.

In some embodiments, one or more of the components of the virtual environment server computer 120 can be, or can include, processors configured to process instructions stored in a memory. For example, a VE creation manager 130 (and/or a portion thereof) and/or an attribute value manager 132 (and/or a portion thereof) can be a combination of a processor and a memory configured to execute instructions related to a process to implement one or more functions.

Although not shown, in some implementations, the components of the virtual environment server computer 120 (or portions thereof) can be configured to operate within, for example, a data center (e.g., a cloud computing environment), a computer system, one or more server/host devices, and/or so forth. In some implementations, the components of the virtual environment server computer 120 (or portions thereof) can be configured to operate within a network. Thus, the components of the virtual environment server computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the virtual environment server computer 120. In some implementations, the 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the client device 200 and/or the components of the virtual environment server computer 120.

The VE creation manager 130 is configured to generate data (i.e., VE data 140) to be realized as the immersive virtual environment by the VR controllers 110(1), . . . , 110(N). For example, the VE creation manager 130 generates data to be realized as avatars representing the users 112(1), . . . , 112(N) and objects with which the users 112(1), . . . , 112(N) interact via the avatars.

The attribute value manager 132 is configured to change one or more aspects of an avatar as the VE data 140 is streamed to the user devices 114(1), . . . , 114(N). For example, the attribute value manager 132 changes an aspect of one avatar in response to that aspect taking on a predefined form (e.g., a giant, a vampire).

The VE data 140, as discussed above, is data that is realized as the immersive virtual environment by the VR controllers 110(1), . . . , 110(N). The VE data 140 includes data to be realized as avatars 142(1), . . . , 142(N) that represent respective users 112(1), . . . , 112(N). The VE data 140 also includes data to be realized as objects 146(1), . . . , 146(M) with which the users 112(1), . . . , 112(N) interact via their respective avatars 142(1), . . . , 142(N).

The data to be realized as an avatar, e.g., avatar 142(1) includes attribute values 144(1,1), . . . , 144(1,N). Each of the attribute values, e.g., 144(1,N) is the value of an attribute of the avatar 142(1), which attribute describes an aspect of the avatar 142(1) as displayed in the VR controller 110(N). It should be understood that, for simplicity FIG. 1 illustrates just one attribute that may have N different values, each of which describes the same aspect of the avatar 142(1), but as displayed in different VR controllers 110(1), . . . , 110(N). However, each avatar, e.g., avatar 142(1) may have many aspects, each of which are described by different, respective attributes.

The data to be realized as an object, e.g., object 146(1), includes an avatar identifier 148(1). The avatar identifier 148(1) identifies an avatar via which a respective user interacts with the object 146(1). For example, if user 112(N) is interacting with the object 146(1) via avatar 142(N), then the avatar identifier 148(1) may take a value equal to N. It should be understood that the data to be realized as the object 146(1) may also contain values of attributes defining various aspects of the object 146(1), but these are not illustrated in FIG. 1 for simplicity of the discussion to follow.

The network 150 provides network connections between the user devices 114(1), . . . , 114(N) and the VE server computer 120. The network 150 may implement any of a variety of protocols and topologies that are in common use for communication over the Internet or other networks. Further, the network 150 may include various components (e.g., cables, switches/routers, gateways/bridges, etc.) that are used in such communications.

During an example operation, the VE server computer 120 receives a request from a user 112(N) via user device 114(N) to participate in an activity within an immersive virtual environment. For example, the activity may be a video game and the request might include data defining an avatar 142(N) that represents the user 112(N). In some arrangements, the immersive virtual environment does not yet exist. In this case, the VE server computer 120 creates the immersive virtual environment. However, it is assumed heretofore that there is at least one other user, e.g., user 112(1) participating in the activity that is represented by an avatar 142(1).

In response to the request, the VE server computer 120 generates an avatar 142(N) representing the user 112(N). For example, the VE server computer 120 may generate the avatar 142(N) from data contained in the request. Alternatively, the VE server computer 120 may generate the avatar 142(N) from data stored in a database (e.g., the request may contain an identifier identifying the user 112(N) and that data may be acquired from the database using the identifier).

After generating the avatar 142(N), the VE server computer 120 performs an avatar comparison operation on each of the existing avatars, e.g., 142(1). For example, the VE server computer 120 may have received information about user preferences for user 112(N). In one example, a user preference may state that the avatar 142(N) must not be shorter than any other avatar, e.g., 142(1). In this example, assume that the attribute values 144(1,1), . . . , 144(1,N) describe the height of the avatar 142(1) as displayed in respective VR controllers 110(1), . . . , 110(N), and so on for the other attribute values. In this case, the VE server computer 120 compares the attribute value 144(1,N) to the attribute value 144(N,N). If the attribute value 144(1,N) is greater than the attribute value 144(N,N) (i.e., the avatar 142(1) is taller than the avatar 142(N) as displayed in the VR controller 110(N)), then the VE server computer 120 changes attribute value 144(1,N) to a different value. In this case, the VE server computer 120 reduces the attribute value 144(1,N) to a value less than or equal to the attribute value 144(N,N).

It should be appreciated that, in the above example, the attribute value 144(1,N) describes the height of the avatar 142(1) as displayed in the VR controller 110(N). The attribute value 144(1,N) does not describe the height of the avatar 142(1) as displayed in the VR controller 110(1) or any other VR controller in the electronic environment 100. Thus, even though the user 112(N) will see the avatar 142(1) as having the same height as or being shorter than the avatar 142(N), the user 112(1) will see no change at all. If the avatar 142(1) is a giant, then the user 112(1) will see the avatar 142(1) as a giant while the user 112(N) may see the avatar 142(1) as having regular height or even as a little person.

It should be further appreciated that any object 146(1), . . . , 146(M) with which the user 112(1) interacts via the avatar 142(1) experiences no change as a result of a change in the attribute value 142(1,N). For example, suppose that the user 112(1) interacts with the object 146(1) via the avatar 142(1) (i.e., the avatar identifier 148(1) is equal to 1). When the avatar 142(1) as displayed in the VR controller 110(N) is shorter than that as displayed in the VR controller 110(1), the object 146(1) is unchanged no matter in what VR controller 110(1), . . . , 110(N) it may be displayed. The advantage of leaving such an object 146(1) can be in the uniformity of experience for all users 112(1), . . . , 112(N). For example, all users 112(1), . . . , 112(N) should see and experience the same video game regardless of how they each perceive the avatars 142(1), . . . , 142(N).

After performing the avatar comparison operation on each of the existing avatars, the VE server computer 120 transmits the VE data 140 to the user devices 114(1), . . . , 114(N) in a data stream via the network 150. Upon receipt, each user device, e.g., user device 114(N) processes the VE data from the data stream and renders the VE data 140 to the display of the respective VR controller, e.g., 110(N).

In some arrangements, the VE server computer 120 does not notify the user 112(1) of any changes to the avatar 142(1) as displayed in the VR controller 110(N). However, in some arrangements, the VE server computer 120 sends a message to the user device 114(1) upon changing the attribute value 144(1,N) to inform the user 112(1) of the change.

While the above example illustrates how either the server or a VR controller can be configured to change the appearance of an avatar of one user in the display of another user, it should be understood that there may be more than two users having avatars in the virtual environment. In that case, it may be possible that each user's VR controller can be configured to cause that user to see the avatar of another user in a different way.

Figure 2:
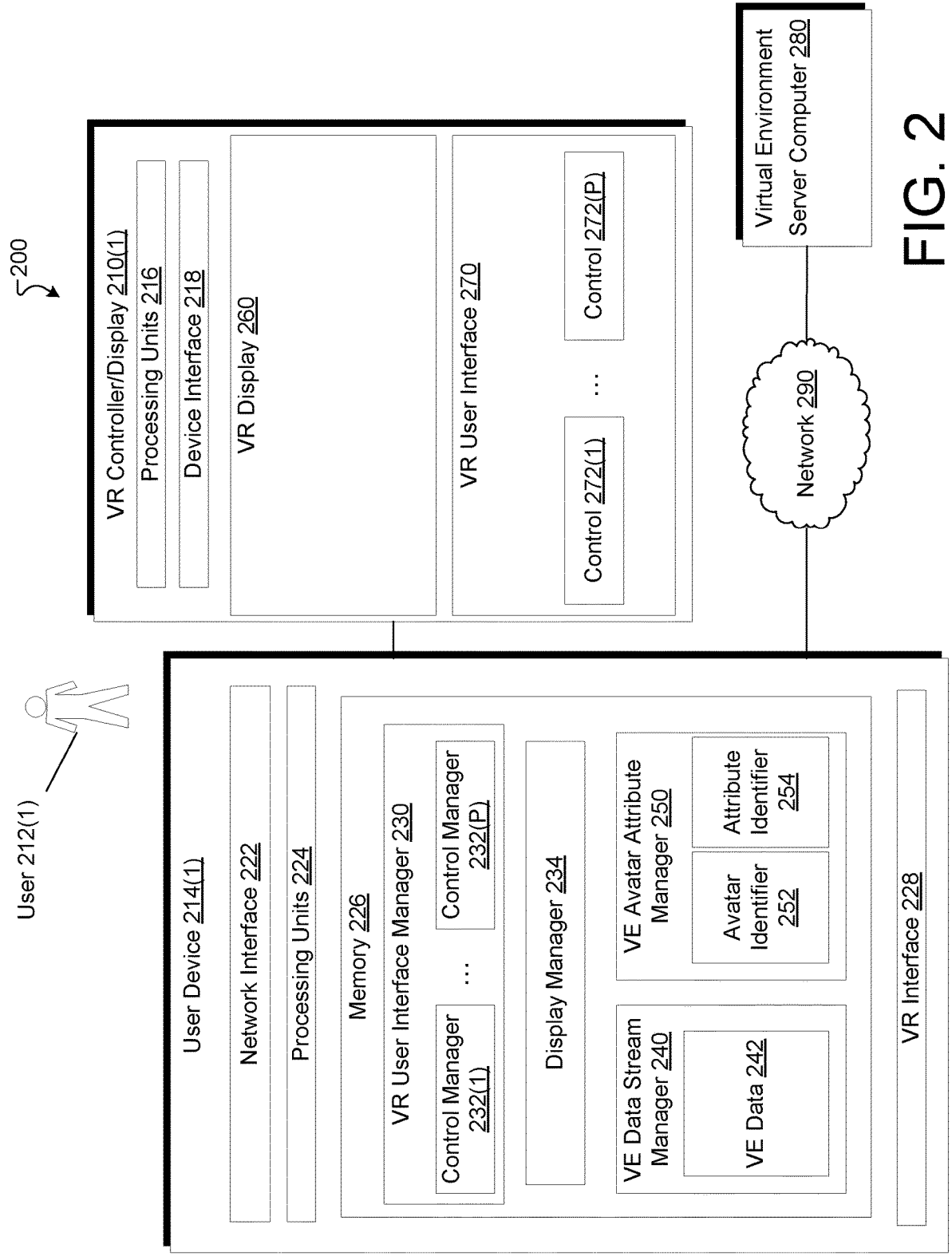
FIG. 2 is a block diagram depicting another example electronic environment for performing the improved techniques of representing users in the VR space.

FIG. 2 is a block diagram of another example electronic environment 200 for performing another embodiment of the improved techniques of representing users in the VR space. The example electronic environment 200 includes a VR controller 210(1), a user device 214(1), a VE server computer 280, and a network 290. It should be understood that the example electronic environment 200 includes other VR controllers and user devices that are not illustrated in FIG. 2.

The VR controller 210(1) is similar to any of VR controllers 110(1), . . . , 110(N) illustrated in FIG. 1. As illustrated in FIG. 2, the VR controller 210(1) includes a set of processing units 216, a device interface 218, a VR display 260, and a VR user interface 270. In some arrangements, the VR controller 210(1) takes the form of a head-mounted display (HMD).

The set of processing units 216 include one or more processing chips and/or assemblies. The set of processing units 216 is configured to carry out instructions for processing generic data within the VR controller 210(1) to facilitate operation of the VR controller 210(1). For example, the set of processing units 216 may carry out instructions from various sensors within the VR controller that control the motion of an avatar representing the user 212(1).

The device interface 218 includes hardware and/or software for exchanging data with the user device 214(1). For example, as the user device 214(1) receives VE data 242 from the VE server computer 280 over the network 290, the device interface 218 receives instructions for displaying the immersive virtual environment on the VR display 260. Moreover, the device interface 218 sends information regarding changes to the immersive virtual environment initiated by the user 212(1) at the VR controller 210(1) back to the user device 214(1).

The VR display 260 is a display configured to provide the immersive virtual environment to the user 212(1). In some arrangements, when the VR controller 210(1) takes the form of an HMD, the VR display 260 is mounted in an interior-facing side of a housing that contains the VR controller 210(1). Images displayed on the VR display 260 may then be focused by means of an optical assembly onto the retinas of the user 212(1).

The VR user interface 270 is configured to take input from the user 212(1) and translate that input into instructions to be carried out by the processing units 216 and/or the device interface 218. In one example, such input may take the form of controls (via controls 272(1), . . . , 272(P)) to control the motion of the avatar representing the user 212(1). In another example, a control, e.g., 272(1) may control other aspects of the immersive virtual environment such as the appearance of other avatars. As illustrated in FIG. 2, the VR user interface 270 is set apart from the VR display 260. In this case, the VR user interface 270 may have a control 270(1) such as a joystick interface, a mouse interface, or the like. In other arrangements, however, the VR user interface 270 is embedded within the VR display 260. In such a case, the controls 272(1), . . . , 272(P) may be virtual and overlaid over the immersive virtual environment. Each control, e.g., control 272(1), might then be activated by motions of the user 212(1).

The user device 214(1) is similar to any of the user devices 114(1), . . . , 114(N) illustrated in FIG. 1. The user device 214(1) includes a network interface 222, a set of processing units 224, memory 226, and a VR interface 228. In some arrangements, the user device 214(1) may be, for example, a smartphone, a controller, a joystick, or another user device(s) that may be paired with, and communicate with, the VR controller 210(1) for interaction in the immersive virtual environment. The user device 214(1) may be operably coupled with, or paired with the VR controller 210(1) via, for example, a wired connection, or a wireless connection such as, for example, a WiFi or Bluetooth connection. This pairing, or operable coupling, of the user device 214(1) and the VR controller 210(1) may provide for communication between the user device 214(1) and the VR controller 210(1) and the exchange of data between the user device 214(1) and the VR controller 210(1). This may allow the user device 214(1) to function as a controller in communication with the VR controller 210(1) for interacting in the immersive virtual environment. That is, a manipulation of the user device 214(1), such as, for example, a beam or ray emitted by the user device 214(1) and directed to a virtual object or feature for selection, and/or an input received on a touch surface of the user device 214(1), and/or a movement of the user device 214(1), may be translated into a corresponding selection, or movement, or other type of interaction, in the immersive virtual environment provided by the VR controller 210(1).

The network interface 222 includes, for example, Ethernet adaptors, Token Ring adaptors, and the like, for converting electronic and/or optical signals received from the network 290 to electronic form for use by the VE server computer 280. The set of processing units 224 include one or more processing chips and/or assemblies. The memory 226 includes both volatile memory (e.g., RAM) and non-volatile memory, such as one or more ROMs, disk drives, solid state drives, and the like. The set of processing units 224 and the memory 226 together form control circuitry, which is configured and arranged to carry out various methods and functions as described herein.

The components (e.g., modules, processing units 224) of the user device 214(1) can be configured to operate based on one or more platforms (e.g., one or more similar or different platforms) that can include one or more types of hardware, software, firmware, operating systems, runtime libraries, and/or so forth. The components of the user device 214(1) can be, or can include, any type of hardware and/or software configured to process attributes. In some implementations, one or more portions of the components shown in the components of the user device 214(1) in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the user device 214(1) can be, or can include, a software module configured for execution by at least one processor (not shown). In some implementations, the functionality of the components can be included in different modules and/or different components than those shown in FIG. 2.

In some embodiments, one or more of the components of the user device 214(1) can be, or can include, processors configured to process instructions stored in a memory. For example, a VR user interface manager 230 (and/or a portion thereof), a display manager (and/or a portion thereof), a VE data stream manager 240 (and/or a portion thereof), and a VE avatar attribute manager 250 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth.

The VR user interface manager 230 is configured to receive and process input from the VR user interface 270 via the VR interface 228. Further, the VR user interface manager 230 includes control managers 232(1), . . . , 232(P) that receive and process input from each respective control 272(1), . . . , 272(P).

The display manager 234 is configured to render the VE data 242 for display on the VR display 260. The display manager, by rendering the VE data 242, produces rendered data formatted for the VR display 260 and sends this rendered data to the VR controller via the VR interface 228.

The VE data stream manager 240 is configured to receive a stream of VE data from the VE server computer 280 over the network 290. Once the stream of data is received, the VE data stream manager 240 parses the stream of data for updates to any values of attributes describing various aspects of the immersive virtual environment. The VE data stream manager 240 may store a snapshot of the stream as VE data 242. The VE data 242 may then take the form of the latest values of various attributes describing various aspects of the immersive virtual environment. Within a rapidly changing virtual environment, the values of the attributes may be continuously changing.

The VE avatar attribute manager 250 is configured to change a value of an attribute describing an aspect of an avatar representing another user within the immersive virtual environment. Upon some instruction provided by the user or some other, predefined instruction, the VE avatar attribute manager 250 works in conjunction with the VE data stream manager 240 to perform a lookup in the stream of data received from the VE server computer 280 over the network 290 for an attribute identified by an avatar identifier 252 and an attribute identifier 254. The VE avatar attribute manager 250 changes the values of such an attribute prior to storing any new VE data 242 for rendering by the display manager 242.

In some arrangements, the VE avatar attribute manager 250 determines the avatar identifier 252 and attribute identifier 254 according to predefined rules. For example, suppose that an avatar wears outerwear containing a slogan that is inappropriate for children. The user device 214(1) may then store a rule in memory stating that the outerwear should be changed to something else if the age of the user 212(1) is less than sixteen. However, in other arrangements, the VE avatar attribute manager 250 may determine the avatar identifier 252 and attribute identifier 254 according to a real-time selection made by the user 212(1) via a control, e.g., control 272(1).

The VR interface 228 includes hardware and/or software for exchanging data with the VR controller 210(1). For example, as the user device 214(1) receives VE data 242 from the VE server computer 280 over the network 290, the VR interface 228 receives rendered data for displaying the immersive virtual environment on the VR display 260. Moreover, the VR interface 228 receives information regarding changes to the immersive virtual environment initiated by the user 212(1) at the VR controller 210(1) back to the user device 214(1).

The VE server computer 280 is similar to the VE server computer 120 as illustrated in FIG. 1. The VE server computer 280 contains hardware and software for generating and transmitting a stream of data representing the immersive virtual environment to user devices including user device 214(1).

The network 290 provides network connections between the user device 214(1) and the VE server computer 280 in a similar manner as network 150 (FIG. 1).

During example operation, the user device 214(1) receives, via the VE data stream manager 240, a stream of data representing the immersive virtual environment from the VE server computer 280 over the network 290. For example, in order to minimize bandwidth used, the VE server computer 280 may only transmit new attribute values (i.e., values that have changed) to user device 214(1). However, when the user 212(1) has just joined in the virtual environment, the VE server computer 280 may transmit values of all attributes defining the various aspects of the virtual environment, including all aspects of each attribute in the virtual environment.

Upon receipt by the VE data stream manager 240, the VE attribute manager 250 searches for any attribute values describing aspects of an avatar that the user 212(1) may find unpleasant. The attributes searched for may be identified by an avatar identifier 252 and an attribute identifier 254. In the example described above, such an attribute value may be a text string of a slogan on outerwear (e.g., a t-shirt) worn by an avatar representing another user in the immersive virtual environment. Other attribute values may describe other aspects of an avatar including the height of the avatar, a facial feature of the avatar, or an overall appearance of the avatar.

The VE avatar attribute manager 250 then changes the attribute value identified by the avatar identifier 252 and the attribute identifier 254 based on predefined parameters. In one example, such predefined parameters may be included in rules stored in the user device 214(1). In some implementations, such a rule may state that if the user 212(1) is under the age of sixteen, then any text string from a slogan on outerwear worn by an avatar must not contain any words on a blacklist. If any such word is included in the text string, then either the slogan is changed or the outerwear is changed altogether by changing the values of the attributes identified in the stream of data.

Once the values of these attributes have been changed, the VE data stream manager 240 stores the attribute values as VE data 242. The display manger 234 then provides rendered data for the VR display 260 and transmits this rendered data to the VR controller 210(1) via the VR interface 228.

In some arrangements, the user 212(1) may also change the values of attributes defining aspects of an avatar after the avatar has been rendered on the VR display 260. Such an arrangement corresponds to the user 212(1) experiencing a negative emotional response to another user's avatar on the VR display 260. Here, the user 212(1) may provide input via a control, e.g., control 272(1) identifying the avatar and the attribute. The input provided via this control 272(1) is relayed to the control manager 232(1) via the device interface 218. The control manager 232(1) then processes this input for the VE avatar attribute manager 250. At this point, the VE avatar attribute manager 250 may perform lookup operations on the incoming stream of data for the identified avatar and attribute. Alternatively, the VE avatar attribute manager 250 may send the avatar identifier 252 and attribute identifier 254 to the VE server computer 280 so that the VE server computer 280 may implement the changes desired by the user 212(1).

FIG. 3A illustrates an example scenario in which a user views an avatar representing another user. Here, a user views an immersive virtual environment using a VR controller 300 (as illustrated, a HMD) connected to a user device 302. The HMD 300 contains the VR display 260. Through the VR display, the user sees two avatars: one avatar 310 representing him/her/themself and another avatar 320 representing another user. The other avatar 320 is seen holding a wand 330.

In this case, the user may experience a negative emotional response upon seeing that the user is interacting with what appears to be a giant. In this case, the user may then select a control that identifies the avatar 320 and the aspect of the avatar 320 that is troubling (i.e., the height).

FIG. 3B illustrates the result of such a selection. Here, the elements are generally the same as in FIG. 3A except that the avatar 320 has become the avatar 340. The avatar 340 is the same height as the avatar 310 and presumably does not interfere with the user's normal activity within the virtual environment.

In some implementations, the wand 330 remains and will continue to remain where it was when held by the giant avatar 320. Thus, even though the wand 330 appears disconnected from the avatar 340, such a disconnection is considered less disruptive than an outright change in the interaction between the wand 330 and everything else in the immersive virtual environment. However, in some arrangements, the object and/or its location within the immersive virtual environment may be altered according to predefined rule and/or model.

Further, in some arrangements, the object may be altered according to some predefined rule and/or model. One example of such a rule may take the form of a statement of the maximum change in distance between a point on an object and a point on an avatar. Along these lines, suppose that a giant avatar is in contact with an object in a first user's display, but in a second user's display, the giant avatar is shrunk to appear as a normal-sized avatar. This rule may cause the VR controller to display the shrunken avatar as still being in touch with the object. Nevertheless, the actions taken by the first user with respect to the object would remain the same. It is the appearance of the object that has changed according to this example rule.

As another example, suppose that two users are playing a game in a virtual environment. In this game, the first user is represented by a giant avatar, while the second user is represented by a normal-sized avatar. If the second user does not wish to interact with a giant avatar, then the second user may configure the second user's VR controller to reduce the size of the giant avatar of the first user to the same size (e.g., height, volume) as the avatar of the first user. Nevertheless, to avoid conflicts in the playing of the game, in some implementations, the rules of the game remain unchanged.

As a specific example variation of the scenario cited above, if the first user's avatar does not fit in a doorway so that the first user's avatar may pass through the doorway in the virtual environment, then even the reduced-sized version of the first user's avatar will not be permitted to pass through the doorway. This would be the case even though from the perspective of the second user, the first user's avatar has a size permitting the first user's avatar to pass through the doorway. The perspective of the first user, will be from the perspective of the giant-sized avatar, so the first user will not have an expectation of being able to pass through the doorway. In some implementations, perspective can be altered if it does not change the action of the users within the game.

In general, suppose that the interaction of the first user and the object via the avatar causes the object to move in some path. Then any change to the appearance of the avatar on the display of the second user will not affect the path of the object caused by the interaction of the first user and the object. This is a more general statement of the physics of the virtual environment being preserved no matter what the appearance of the avatars may be on different users' displays.

FIG. 4A illustrates another example scenario in which a user views an avatar representing another user. Here, a user views an immersive virtual environment using the VR controller 300 (as illustrated, a HMD) connected to the user device 302. The HMD 300 contains the VR display 260. Through the VR display, the user sees an avatar 420 representing another user. The avatar 420 is shown holding a wand 430.

In this case, the user may experience a negative emotional response upon seeing that the user is interacting with what appears to be an avatar 320 having frightening facial features (e.g., that of a skeleton). In this case, the user may then select a control that identifies the avatar 320 and the aspect of the avatar 320 that is troubling (i.e., the facial feature).

FIG. 4B illustrates the result of such a selection. Here, the elements are generally the same in FIG. 3A except that the avatar 420 has become the avatar 440. The avatar 440 now has a benign facial feature (e.g., that of a cute bunny) and presumably does not interfere with the user's normal activity within the virtual environment.

FIG. 5A illustrates an example scenario in which a user views an avatar representing another user. Here, a user views an immersive virtual environment using a VR controller 300 (as illustrated, a HMD) connected to a user device 302. The HMD 300 contains the VR display 260. Through the VR display, the user sees two avatars: one avatar 510 representing the user and another avatar 520 representing another user. The other avatar 520 is shown holding a wand 530.

In this case, the user may experience a negative emotional response upon seeing that he/she/they is interacting with what appears to be a giant. In this case, the user may then select a control that identifies the avatar 320 and the aspect of the avatar 320 that is to be changed (i.e., the overall appearance).

FIG. 5B illustrates the result of such a selection. Here, the elements are generally the same in FIG. 5A except that the avatar 520 has become the avatar 540. The avatar 540 is now perceived as a small rabbit and may not interfere with the user's normal activity within the virtual environment. Again, in this implementation, the wand 530 remains and will continue to remain where it was when held by the giant avatar 520.

Figure 6:
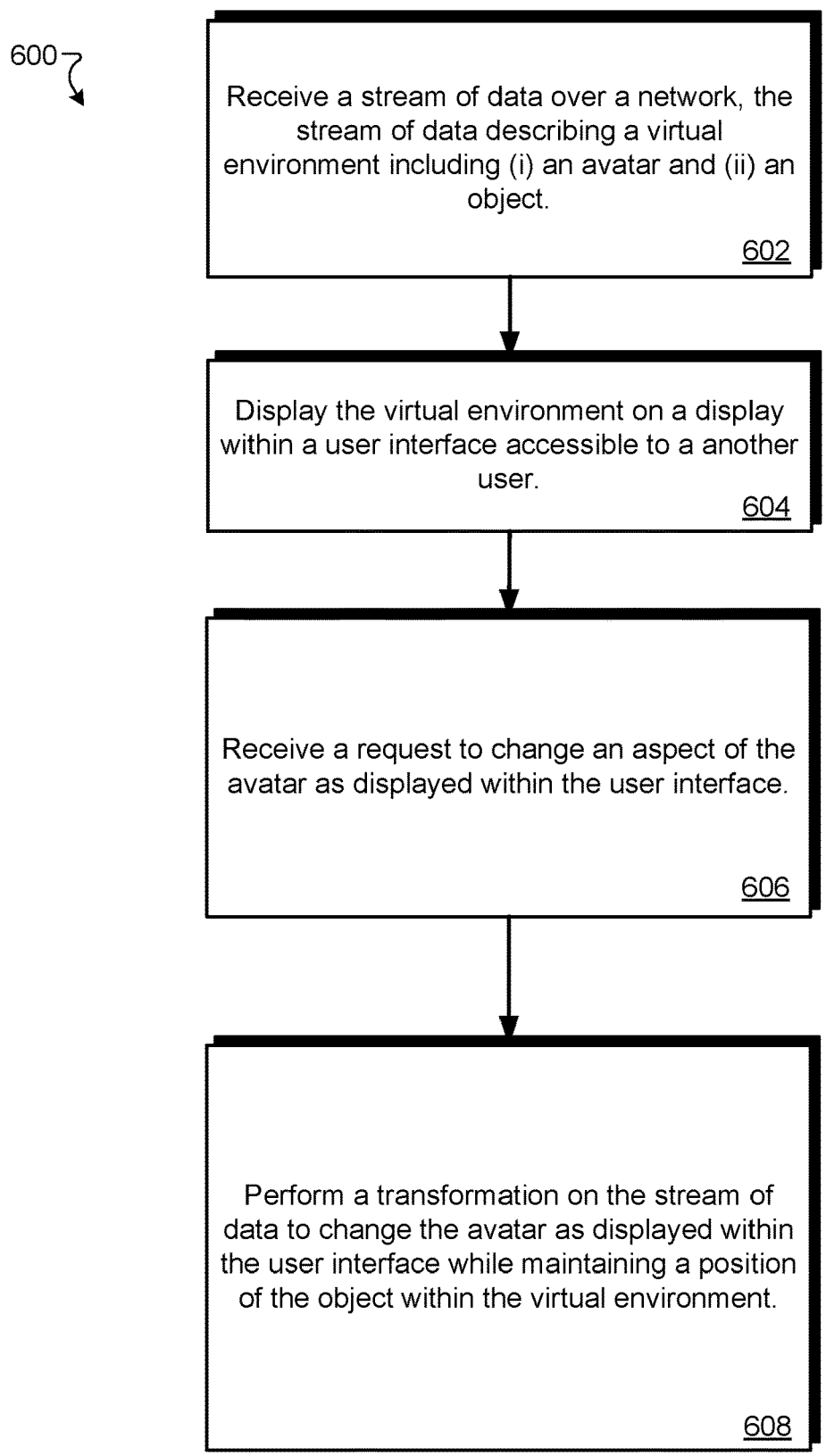
FIG. 6 is a flow chart depicting an example method of performing the improved techniques of representing users in a virtual reality (VR) space.

FIG. 6 illustrates a flow chart that describes a method 600 to which one embodiment of the improved techniques is directed. The method 600 may be performed by software constructs described in connection with FIG. 2, which reside in memory 226 of the user device 214(1) and are run by the set of processing units 224.

At 602, a user device receives a stream of data over a network, the stream of data defining a virtual environment including (i) an avatar representing a first user within the virtual environment and (ii) an object with which the first user interacts via the avatar within the virtual environment.

At 604, the user device displays the virtual environment on a display within a user interface accessible to a second user. As illustrated in FIG. 2, the user interface and display are included in a VR controller connected to the user device.

At 606, while displaying the virtual environment within the user interface, the user device receives a request to change an aspect of the avatar as displayed within the user interface on the display, the aspect of the avatar being defined by a first value of an attribute in the stream of data. The request may be automatically generated via a rule-based system or directly from the user.

At 608, in response to receiving the request, the user device performs a transformation on the stream of data received over the network, the transformation (i) changing the value of the attribute of the avatar from the first value to a second value as the stream of data is received and (ii) maintaining a spatial position of the object within the virtual environment relative to the avatar when the aspect of the avatar is defined by the first value of the attribute.

Figure 7:
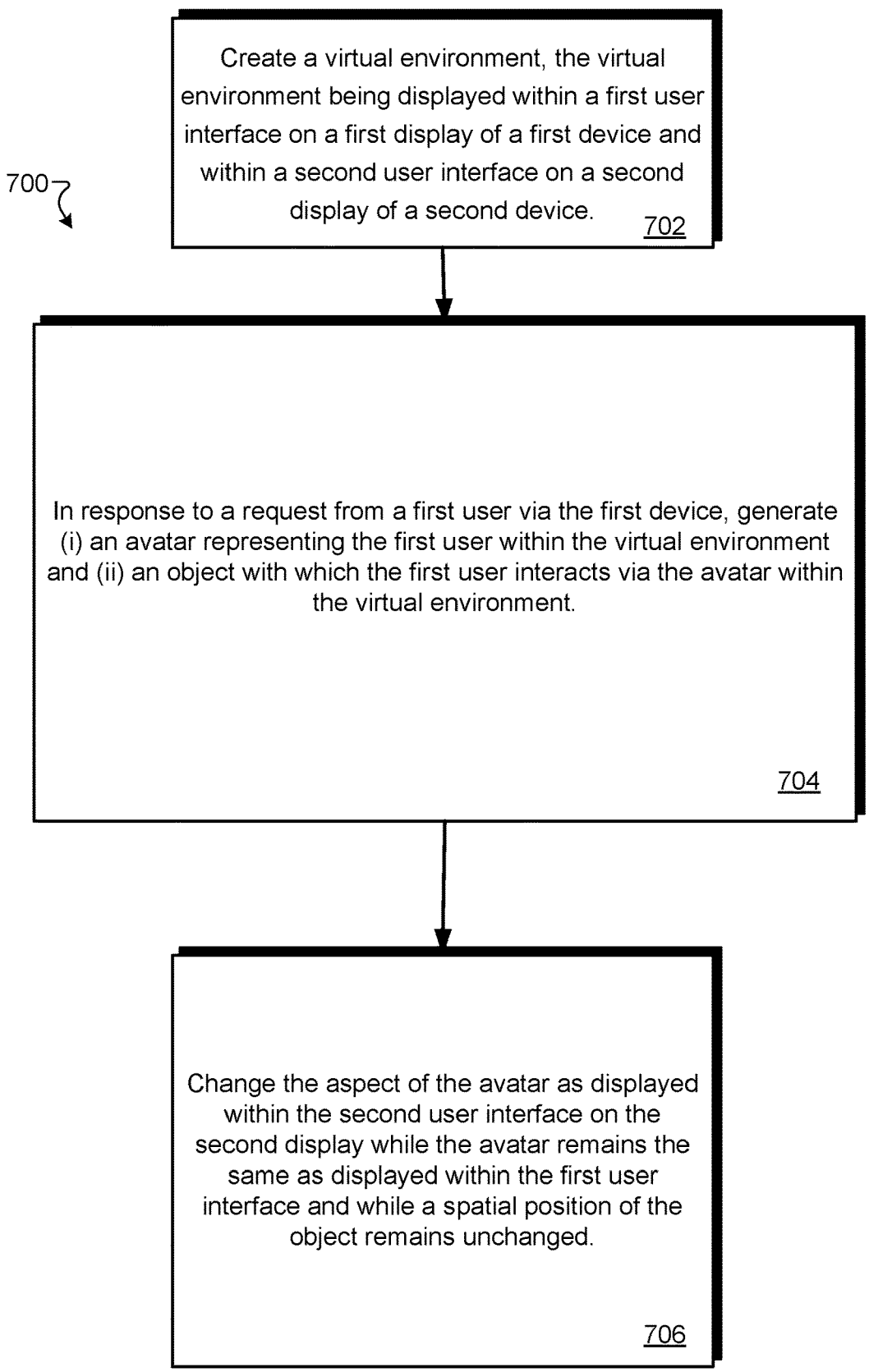
FIG. 7 is a flow chart depicting another example method of performing the improved techniques of representing users in a virtual reality (VR) space.

FIG. 7 illustrates a flow chart that describes a method 700 to which one embodiment of the improved techniques is directed. The method 700 may be performed by software constructs described in connection with FIG. 1, which reside in memory 126 of the VE server computer 120 and are run by the set of processing units 124.

At 702, a VE server computer creates a virtual environment, the virtual environment being displayed within a first user interface on a first display of a first device and within a second user interface on a second display of a second device.

At 704, in response to a request from a first user via the first device, the VE server computer generates (i) an avatar representing the first user within the virtual environment and (ii) an object with which the first user interacts via the avatar within the virtual environment. The avatar has a first attribute and a second attribute, the first attribute of the avatar describing an aspect of the avatar as displayed within the first user interface on the first display, the second attribute of the avatar describing the aspect of the avatar as displayed within the second user interface on the second display, the first attribute of the avatar and the second attribute of the avatar each having a value equal to a first value. The object has a spatial position within the virtual environment relative to the avatar as displayed within the first user interface on the first display and as displayed within the second user interface on the second display.

At 706, after generating the avatar, the VE server computer changes the value of the second attribute of the avatar from the first value to a second value to change the aspect of the avatar as displayed within the second user interface on the second display while (i) the value of the first attribute of the avatar remains equal to the first value and (ii) the spatial position of the object remains unchanged relative to the avatar as displayed within the first user interface on the first display.

In some implementations, the VE server computer 120 may provide virtual mirrors by which users may examine their avatars. For example, in most virtual environments, a user is not aware of how his or her avatar appears within the virtual environment because the VE server computer 120 presents the virtual environment to the user from a first-person perspective, i.e., his or her own perspective.

In some implementations, a virtual mirror is an object within the virtual environment that displays to a user an image of his or her own avatar on a display of a user interface accessible to that user. The virtual mirror can be a permanent object within the virtual environment or instead can be a transient object that appears on demand.

The virtual mirror can take the appearance of a mirror in the virtual environment in that it has a shape (e.g., rectangular, circular, elliptical) and, when a user's avatar stands in front of it, it will display the front of the avatar as would be displayed according to a geometrical optics model of light in the vicinity of the mirror. Such a mirror can appear in a fixed location or in a location of the user's choosing within the virtual environment (e.g., on a wall). The mirror solves the problem that a user immersed in a virtual environment has typically has only a limited field of view of the virtual environment so that an immersed user is typically not able to view its own avatar. The virtual mirror overcomes this limitation.

In other implementations, however, the virtual mirror can take the form of a button or some other control that, when activated, replaces the image of the virtual environment with an image of the user's avatar. This has the advantage of looking at the avatar head-on rather than at some angle of projection that depends on where the avatar stands with respect to the mirror.

In some implementations, upon viewing their avatar in a mirror (i.e., on a display as a result of activating a mirror), the user may send a request to the VE server computer 120 to alter an aspect of the avatar. For example, the user may wish to alter an aspect of the face of the avatar, e.g., a smile, so that it appears more pleasing to the user.

Figure 8:
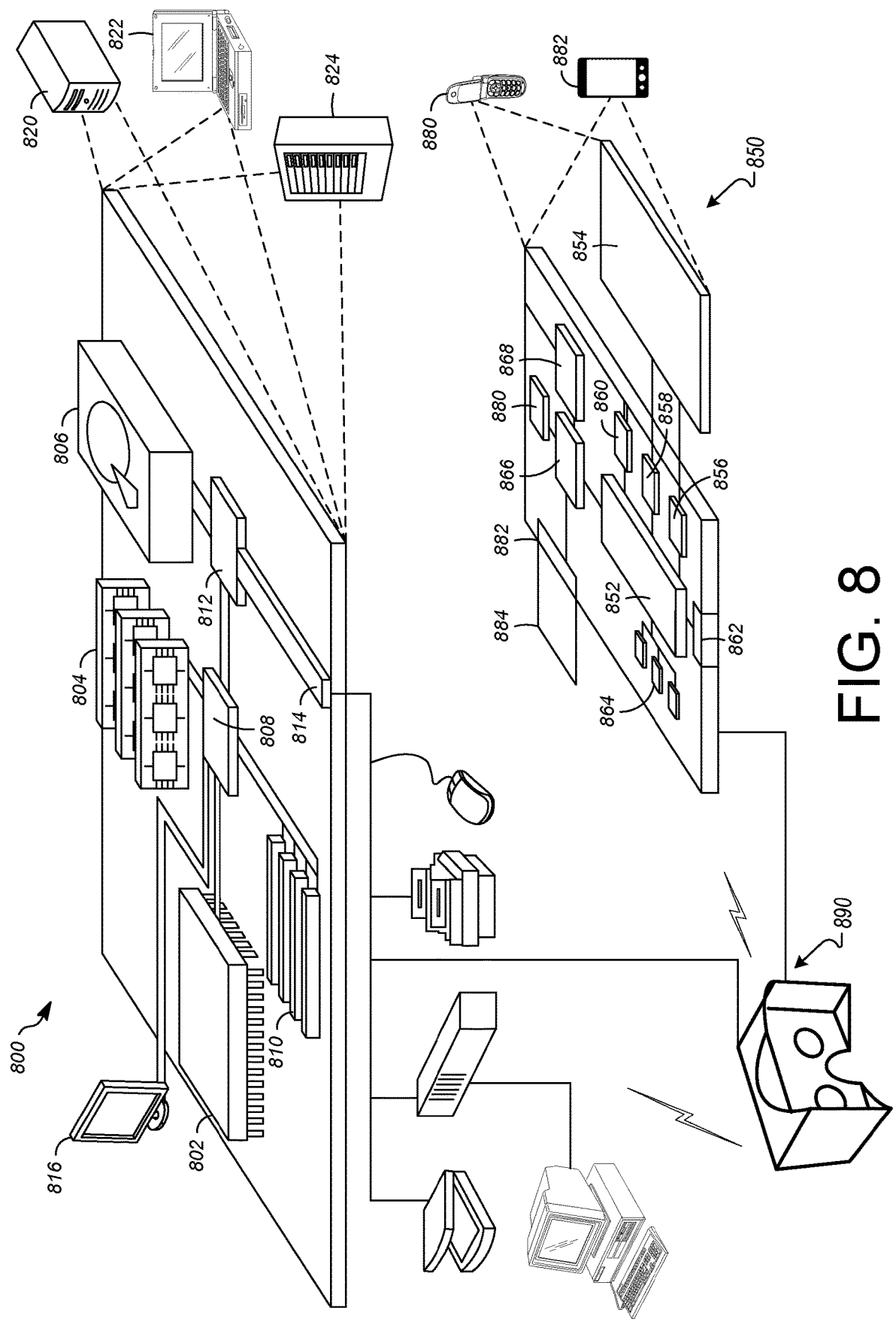
FIG. 8 shows an example of a computer device and a mobile computer device that can be used to implement the techniques described herein.

FIG. 8 shows an example of a generic computer device 800 and a generic mobile computer device 850, which may be used with the techniques described here. Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 600, including instructions stored in the memory 804 or on the storage device 806 to display graphical information for a GUI on an external input/output device, such as display 816 coupled to high speed interface 808. In some implementations, multiple processors and/or multiple buses may be used, as appropriate, along with multiple memories and types of memory. In addition, multiple computing devices 800 may be connected, with each device providing portions of the necessary operations (e.g., as a server bank, a group of blade servers, or a multi-processor system).

The memory 804 stores information within the computing device 600. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 600. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 600, 850, and an entire system may be made up of multiple computing devices 600, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with a virtual reality (VR headset 890). For example, one or more sensors included on a computing device 850 or other computing device depicted in FIG. 8, can provide input to VR headset 890 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 850 can use the sensors to determine an absolute position and/or a detected rotation of the computing device in the VR space that can then be used as input to the VR space. For example, the computing device 850 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 850 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 850 when the computing device is incorporated into the VR space can cause a particular action to occur in the VR space.

In some implementations, a touchscreen of the computing device 850 can be rendered as a touchpad in VR space. A user can interact with the touchscreen of the computing device 850. The interactions are rendered, in VR headset 890 for example, as movements on the rendered touchpad in the VR space. The rendered movements can control objects in the VR space.

In some implementations, one or more output devices included on the computing device 850 can provide output and/or feedback to a user of the VR headset 890 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 850 may appear as another object in a computer-generated, 3D environment. Interactions by the user with the computing device 850 (e.g., rotating, shaking, touching a touchscreen, swiping a finger across a touch screen) can be interpreted as interactions with the object in the VR space. In the example of the laser pointer in a VR space, the computing device 850 appears as a virtual laser pointer in the computer-generated, 3D environment. As the user manipulates the computing device 850, the user in the VR space sees movement of the laser pointer. The user receives feedback from interactions with the computing device 850 in the VR space on the computing device 850 or on the VR headset 890.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Figure 9:
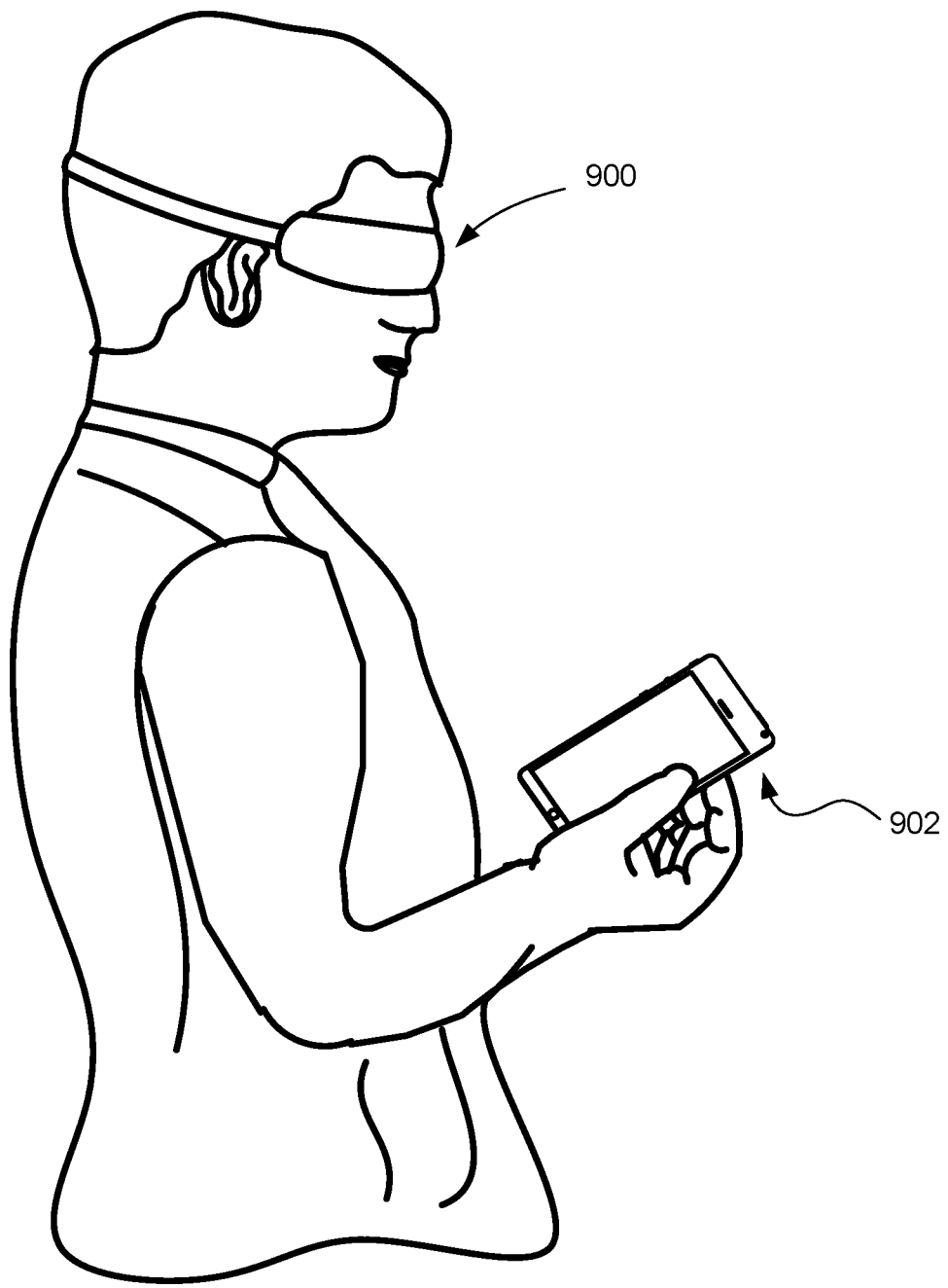
FIG. 9 is a diagram depicting an example VR head-mounted display (HMD).

FIG. 9 illustrates an example implementation of a head-mounted display as shown in FIGS. 3-5. In FIG. 9, a user wearing an HMD 900 is holding a portable handheld electronic device 902. The handheld electronic device 902 may be, for example, a smartphone, a controller, a joystick, or another portable handheld electronic device(s) that may be paired with, and communicate with, the HMD 900 for interaction in the immersive virtual environment generated by the HMD 900. The handheld electronic device 902 may be operably coupled with, or paired with the HMD 900 via, for example, a wired connection, or a wireless connection such as, for example, a WiFi or Bluetooth connection. This pairing, or operable coupling, of the handheld electronic device 902 and the HMD 900 may provide for communication between the handheld electronic device 902 and the HMD 900 and the exchange of data between the handheld electronic device 902 and the HMD 900. This may allow the handheld electronic device 902 to function as a controller in communication with the HMD 900 for interacting in the immersive virtual environment generated by the HMD 900. That is, a manipulation of the handheld electronic device 902, such as, for example, a beam or ray emitted by the handheld electronic device 902 and directed to a virtual object or feature for selection, and/or an input received on a touch surface of the handheld electronic device 902, and/or a movement of the handheld electronic device 902, may be translated into a corresponding selection, or movement, or other type of interaction, in the immersive virtual environment generated by the HMD 900. For example, the HMD 900, together with the handheld electronic device 902, may generate a virtual environment as described above, and the handheld electronic device 902 may be manipulated to effect a change in scale, or perspective, of the user relative to the virtual features in the virtual environment as described above.

FIGS. 10A and 10B are perspective views of an example HMD, such as, for example, the HMD 900 worn by the user in FIG. 9, and FIG. 2C illustrates an example handheld electronic device, such as, for example, the handheld electronic device 902 shown in FIG. 9.

The handheld electronic device 902 may include a housing 903 in which internal components of the device 902 are received, and a user interface 904 on an outside of the housing 903, accessible to the user. The user interface 904 may include a touch sensitive surface 906 configured to receive user touch inputs. The user interface 904 may also include other components for manipulation by the user such as, for example, actuation buttons, knobs, joysticks and the like. In some implementations, at least a portion of the user interface 904 may be configured as a touchscreen, with that portion of the user interface 904 being configured to display user interface items to the user, and also to receive touch inputs from the user on the touch sensitive surface 906. The handheld electronic device 902 may also include a light source 908 configured to selectively emit light, for example, a beam or ray, through a port in the housing 903, for example, in response to a user input received at the user interface 904.

The HMD 900 may include a housing 910 coupled to a frame 920, with an audio output device 930 including, for example, speakers mounted in headphones, also be coupled to the frame 920. In FIG. 2B, a front portion 910a of the housing 910 is rotated away from a base portion 910b of the housing 910 so that some of the components received in the housing 910 are visible. A display 940 may be mounted on an interior facing side of the front portion 910a of the housing 910. Lenses 950 may be mounted in the housing 910, between the user's eyes and the display 940 when the front portion 910a is in the closed position against the base portion 910b of the housing 910. In some implementations, the HMD 900 may include a sensing system 9160 including various sensors and a control system 970 including a processor 990 and various control system devices to facilitate operation of the HMD 900.

In some implementations, the HMD 900 may include a camera 980 to capture still and moving images. The images captured by the camera 980 may be used to help track a physical position of the user and/or the handheld electronic device 902 in the real world, or physical environment relative to the virtual environment, and/or may be displayed to the user on the display 940 in a pass through mode, allowing the user to temporarily leave the virtual environment and return to the physical environment without removing the HMD 900 or otherwise changing the configuration of the HMD 900 to move the housing 910 out of the line of sight of the user.

In some implementations, the HMD 900 may include a gaze tracking device 965 to detect and track an eye gaze of the user. The gaze tracking device 965 may include, for example, an image sensor 965A, or multiple image sensors 965A, to capture images of the user's eyes, for example, a particular portion of the user's eyes, such as, for example, the pupil, to detect, and track direction and movement of, the user's gaze. In some implementations, the HMD 900 may be configured so that the detected gaze is processed as a user input to be translated into a corresponding interaction in the immersive virtual experience.

Further implementations are described in the following examples:

Example 1

A computer-implemented method, the method comprising: receiving a stream of data over a network, the stream of data defining a virtual environment including (i) an avatar representing a first user within the virtual environment and (ii) an object with which the first user interacts via the avatar within the virtual environment; displaying the virtual environment on a display within a user interface accessible to a second user; while displaying the virtual environment within the user interface, receiving a request to change an aspect of the avatar as displayed within the user interface on the display, the aspect of the avatar being defined by a first value of an attribute in the stream of data; and in response to receiving the request, performing a transformation on the stream of data received over the network, the transformation (i) changing the value of the attribute of the avatar from the first value to a second value as the stream of data is received and (ii) maintaining a spatial position of the object within the virtual environment relative to the avatar when the aspect of the avatar is defined by the first value of the attribute.

Example 2

A computer-implemented method as in example 1, wherein the aspect of the avatar as displayed within the user interface on the display includes a height of the avatar within the virtual environment; and wherein performing the transformation on the stream of data received over the network includes changing the height of the avatar as displayed within the user interface on the display from a first value to a second value.

Example 3

A computer-implemented method as in example 2, wherein the avatar is a first avatar; wherein the virtual environment further includes a second avatar representing the second user within the virtual environment; and wherein changing the height of the avatar as displayed within the user interface on the display from a first value to a second value includes reducing the height of the first avatar to a height no greater than a height of the second avatar.

Example 4

A computer-implemented method as in any one of examples 1 to 3, wherein the aspect of the avatar as displayed within the user interface on the display includes a facial feature of the avatar within the virtual environment; and wherein performing the transformation on the stream of data received over the network includes changing the facial feature of the avatar as displayed within the second user interface on the second display.

Example 5

A computer-implemented method as in any one of examples 1 to 4, wherein the aspect of the avatar as displayed within the second user interface on the second display includes outerwear worn by the avatar within the virtual environment; and wherein changing the value of the second attribute of the avatar from the first value to the second value includes changing the outerwear worn by the avatar as displayed within the second user interface on the second display.

Example 6

A computer-implemented method as in any one of examples 1 to 5, further comprising: receiving a first request from the first user to generate a virtual mirror within the virtual environment, the virtual mirror being configured to display an image of the avatar on a display within a user interface accessible to the first user; in response to receiving the request, adjusting the stream of data received over the network to produce the virtual mirror; and wherein receiving the request to change the aspect of the avatar as displayed within the user interface on the display includes, after adjusting the stream of data received over the network to produce the virtual mirror, receiving a second request from the first user to change the aspect of the avatar.

Example 7

A computer-implemented method, the method comprising: creating a virtual environment, the virtual environment being displayed within a first user interface on a first display of a first device and within a second user interface on a second display of a second device; in response to a request from a first user via the first device, generating (i) an avatar representing the first user within the virtual environment and (ii) an object with which the first user interacts via the avatar within the virtual environment, the avatar having a first attribute and a second attribute, the first attribute of the avatar describing an aspect of the avatar as displayed within the first user interface on the first display, the second attribute of the avatar describing the aspect of the avatar as displayed within the second user interface on the second display, the first attribute of the avatar and the second attribute of the avatar each having a value equal to a first value, the object having a spatial position within the virtual environment relative to the avatar as displayed within the first user interface on the first display and as displayed within the second user interface on the second display; and after generating the avatar, changing the value of the second attribute of the avatar from the first value to a second value to change the aspect of the avatar as displayed within the second user interface on the second display while (i) the value of the first attribute of the avatar remains equal to the first value and (ii) the spatial position of the object remains unchanged relative to the avatar as displayed within the first user interface on the first display.

Example 8

A computer program product comprising a nontransitive storage medium, the computer program product including code that, when executed by processing circuitry of a computer, causes the processing circuitry to perform a method, the method comprising: receiving a stream of data over a network, the stream of data defining a virtual environment including (i) an avatar representing a first user within the virtual environment and (ii) an object with which the first user interacts via the avatar within the virtual environment; displaying the virtual environment on a display within a user interface accessible to a second user; while displaying the virtual environment within the user interface, receiving a request to change an aspect of the avatar as displayed within the user interface on the display, the aspect of the avatar being defined by a first value of an attribute in the stream of data; and in response to receiving the request, performing a transformation on the stream of data received over the network, the transformation (i) changing the value of the attribute of the avatar from the first value to a second value as the stream of data is received and (ii) maintaining a spatial position of the object within the virtual environment relative to the avatar when the aspect of the avatar is defined by the first value of the attribute.

Example 9

A computer program product as in example 8, wherein the aspect of the avatar as displayed within the user interface on the display includes a height of the avatar within the virtual environment; and wherein performing the transformation on the stream of data received over the network includes changing the height of the avatar as displayed within the user interface on the display from a first value to a second value.

Example 10

A computer program product as in example 9, wherein the avatar is a first avatar; wherein the virtual environment further includes a second avatar representing the second user within the virtual environment; and wherein changing the height of the avatar as displayed within the user interface on the display from a first value to a second value includes reducing the height of the first avatar to a height no greater than a height of the second avatar.

Example 11

A computer program product as in any of examples 8 to 10, wherein the aspect of the avatar as displayed within the user interface on the display includes a facial feature of the avatar within the virtual environment; and wherein performing the transformation on the stream of data received over the network includes changing the facial feature of the avatar as displayed within the second user interface on the second display.

Example 12

A computer program product as in any of examples 8 to 11, wherein the aspect of the avatar as displayed within the second user interface on the second display includes outerwear worn by the avatar within the virtual environment; and wherein changing the value of the second attribute of the avatar from the first value to the second value includes changing the outerwear worn by the avatar as displayed within the second user interface on the second display.

Example 13

A computer program product as in any of examples 8 to 12, wherein in the method further comprises: receiving a first request from the first user to generate a virtual mirror within the virtual environment, the virtual mirror being configured to display an image of the avatar on a display within a user interface accessible to the first user; in response to receiving the request, adjusting the stream of data received over the network to produce the virtual mirror; and wherein receiving the request to change the aspect of the avatar as displayed within the user interface on the display includes, after adjusting the stream of data received over the network to produce the virtual mirror, receiving a second request from the first user to change the aspect of the avatar.

Example 14

An electronic apparatus, comprising: a network interface; memory; and controlling circuitry coupled to the memory, the controlling circuitry being configured to: receive a stream of data over a network, the stream of data describing a virtual environment including (i) an avatar representing a first user within the virtual environment and (ii) an object with which the first user interacts via the avatar within the virtual environment; display the virtual environment on a display within a user interface accessible to a second user; while displaying the virtual environment within the user interface, receive a request to change an aspect of the avatar as displayed within the user interface on the display, the aspect of the avatar being described by a first value of an attribute in the stream of data; and in response to receiving the request, perform a transformation on the stream of data received over the network, the transformation (i) changing the value of the attribute of the avatar from the first value to a second value as the stream of data is received and (ii) maintaining a spatial position of the object within the virtual environment relative to the avatar when the aspect of the avatar is described by the first value of the attribute.

Example 15

An electronic apparatus as in example 14, wherein the aspect of the avatar as displayed within the user interface on the display includes a height of the avatar within the virtual environment; and wherein the controlling circuitry configured to perform the transformation on the stream of data received over the network is further configured to change the height of the avatar as displayed within the user interface on the display from a first value to a second value.

Example 16

An electronic apparatus as in example 15, wherein the avatar is a first avatar; wherein the virtual environment further includes a second avatar representing the second user within the virtual environment; and wherein the controlling circuitry configured to change the height of the avatar as displayed within the user interface on the display from a first value to a second value is further configured to reduce the height of the first avatar to a height no greater than a height of the second avatar.

Example 17

An electronic apparatus as in any one of examples 14 to 16, wherein the aspect of the avatar as displayed within the user interface on the display includes a facial feature of the avatar within the virtual environment; and wherein the controlling circuitry configured to perform the transformation on the stream of data received over the network includes is further configured to change the facial feature of the avatar as displayed within the second user interface on the second display.

Example 18

An electronic apparatus as in any one of examples 14 to 17, wherein the aspect of the avatar as displayed within the second user interface on the second display includes outerwear worn by the avatar within the virtual environment; and wherein the controlling circuitry configured to change the value of the second attribute of the avatar from the first value to the second value is further configured to change the outerwear worn by the avatar as displayed within the second user interface on the second display.

Example 19

An electronic apparatus as in any one of examples 14 to 18, wherein the controlling circuitry is further configured to receive a first request from the first user to generate a virtual mirror within the virtual environment, the virtual mirror being configured to display an image of the avatar on a display within a user interface accessible to the first user; in response to receiving the request, adjust the stream of data received over the network to produce the virtual mirror, and wherein the controlling circuitry configured to receive the request to change the aspect of the avatar as displayed within the user interface on the display is further configured to, after adjusting the stream of data received over the network to produce the virtual mirror, receive a second request from the first user to change the aspect of the avatar.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, the method comprising:
   receiving a stream of data over a network, the stream of data defining a virtual environment including (i) an avatar representing a first user within the virtual environment, the avatar being displayed on a first display within a first user interface accessible to the first user and (ii) an object with which the first user interacts via the avatar within the virtual environment, the object being caused to move in a path determined by the interaction of the first user with the object;
   displaying the virtual environment on a second display within a second user interface accessible to a second user;
   while displaying the virtual environment within the second user interface, receiving a request to change an aspect of the avatar as displayed within the second user interface on the second display, the aspect of the avatar (i) being defined by a first value of an attribute in the stream of data and (ii) including a size of the avatar within the virtual environment; and
   in response to receiving the request, performing a transformation on the stream of data received over the network, the transformation (i) changing the value of the size of the avatar from the first value to a second value as the stream of data is received and (ii) maintaining a spatial position of the object within the virtual environment relative to the avatar when the aspect of the avatar is defined by the first value of the attribute, including preserving the path determined by the interaction of the first user with the object as viewed by the second user on the second display in response to the value of the size of the avatar being changed from the first value to a second value as the stream of data is received, data representing the object after the changing of the value of the attribute of the avatar remaining the same as the data representing the object prior to the changing of the value of the attribute of the avatar.

2. A computer-implemented method as in claim 1, wherein the avatar is a first avatar;
   wherein the virtual environment further includes a second avatar representing the second user within the virtual environment; and wherein changing the height of the avatar as displayed within the second user interface on the second display from a first value to a second value includes reducing the height of the first avatar to a height no greater than a height of the second avatar.

3. A computer-implemented method as in claim 1,
wherein the aspect of the avatar as displayed within the second user interface on the second display includes a facial feature of the avatar within the virtual environment; and
wherein performing the transformation on the stream of data received over the network includes changing the facial feature of the avatar as displayed within the second user interface on the second display.

4. A computer-implemented method as in claim 1, wherein the aspect of the avatar as displayed within the second user interface on the second display includes outerwear worn by the avatar within the virtual environment; and
wherein changing the value of the second attribute of the avatar from the first value to the second value includes changing the outerwear worn by the avatar as displayed within the second user interface on the second display.

5. A computer-implemented method as in claim 1, further comprising:
receiving a first request from the first user to generate a virtual mirror within the virtual environment, the virtual mirror being configured to display an image of the avatar on the first display within the first user interface;
in response to receiving the request, adjusting the stream of data received over the network to produce the virtual mirror; and
wherein receiving the request to change the aspect of the avatar as displayed within the second user interface on the second display includes, after adjusting the stream of data received over the network to produce the virtual mirror, receiving a second request from the first user to change the aspect of the avatar.

6. A method as in claim 1, wherein data realized as the object includes an identifier identifying the avatar.

7. A computer-implemented method, the method comprising:
creating a virtual environment, the virtual environment being displayed within a first user interface on a first display of a first device and within a second user interface on a second display of a second device;
in response to a request from a first user via the first device, generating (i) an avatar representing the first user within the virtual environment and (ii) an object with which the first user interacts via the avatar within the virtual environment, the object being caused to move in a path determined by the interaction of the first user with the object,
the avatar having a first attribute and a second attribute, the first attribute of the avatar describing an aspect of the avatar as displayed within the first user interface on the first display, the second attribute of the avatar describing the aspect of the avatar as displayed within the second user interface on the second display, the first attribute of the avatar and the second attribute of the avatar each having a value equal to a first value, the aspect relating to a size of the avatar, the object having a spatial position within the virtual environment relative to the avatar as displayed within the first user interface on the first display and as displayed within the second user interface on the second display; and after generating the avatar, changing the value of the second attribute of the avatar from the first value to a second value to change the aspect of the avatar as displayed within the second user interface on the second display while (i) the value of the first attribute of the avatar remains equal to the first value and (ii) the spatial position of the object remains unchanged relative to the avatar as displayed within the first user interface on the first display, the path determined by the interaction of the first user with the object as viewed by the second user on the second display being preserved in response to the value of the size of the avatar being changed from the first value to a second value as the stream of data is received.

8. A computer program product comprising a non-transitive storage medium, the non-transitory storage medium including code that, when executed by processing circuitry of a computer, causes the processing circuitry to perform a method, the method comprising:
receiving a stream of data over a network, the stream of data defining a virtual environment including (i) an avatar representing a first user within the virtual environment, the avatar being displayed on a first display within a first user interface accessible to the first user and (ii) an object with which the first user interacts via the avatar within the virtual environment, the object being caused to move in a path determined by the interaction of the first user with the object;
displaying the virtual environment on a second display within a second user interface accessible to a second user;
while displaying the virtual environment within the second user interface, receiving a request to change an aspect of the avatar as displayed within the second user interface on the second display, the aspect of the avatar (i) being defined by a first value of an attribute in the stream of data and (ii) including a size of the avatar within the virtual environment; and
in response to receiving the request, performing a transformation on the stream of data received over the network, the transformation (i) changing the value of the height of the avatar from the first value to a second value as the stream of data is received and (ii) maintaining a spatial position of the object within the virtual environment relative to the avatar when the aspect of the avatar is defined by the first value of the attribute, including preserving the path determined by the interaction of the first user with the object as viewed by the second user on the second display in response to the value of the size of the avatar being changed from the first value to a second value as the stream of data is received, data representing the object after the changing of the value of the attribute of the avatar remaining the same as the data representing the object prior to the changing of the value of the attribute of the avatar.

9. A computer program product as in claim 8, wherein the avatar is a first avatar;
wherein the virtual environment further includes a second avatar representing the second user within the virtual environment; and
wherein changing the size of the avatar as displayed within the second user interface on the second display from a first value to a second value includes reducing the size of the first avatar to a size no greater than a size of the second avatar.

10. A computer program product as in claim 8, wherein the aspect of the avatar as displayed within the second user interface on the second display includes a facial feature of the avatar within the virtual environment; and
wherein performing the transformation on the stream of data received over the network includes changing the facial feature of the avatar as displayed within the second user interface on the second display.

11. A computer program product as in claim 8, wherein the aspect of the avatar as displayed within the second user interface on the second display includes outerwear worn by the avatar within the virtual environment; and
wherein changing the value of the second attribute of the avatar from the first value to the second value includes changing the outerwear worn by the avatar as displayed within the second user interface on the second display.

12. A computer program product as in claim 8, wherein in the method further comprises:
receiving a first request from the first user to generate a virtual mirror within the virtual environment, the virtual mirror being configured to display an image of the avatar on the first display within the first user interface;
in response to receiving the request, adjusting the stream of data received over the network to produce the virtual mirror; and
wherein receiving the request to change the aspect of the avatar as displayed within the second user interface on the second display includes, after adjusting the stream of data received over the network to produce the virtual mirror, receiving a second request from the first user to change the aspect of the avatar.

13. An electronic apparatus, comprising:
a network interface;
memory; and
controlling circuitry coupled to the memory, the controlling circuitry being configured to:
receive a stream of data over a network, the stream of data defining a virtual environment including (i) an avatar representing a first user within the virtual environment, the avatar being displayed on a first display within a first user interface accessible to the first user and (ii) an object with which the first user interacts via the avatar within the virtual environment, the object being caused to move in a path determined by the interaction of the first user with the object;
display the virtual environment on a second display within a second user interface accessible to a second user;
while displaying the virtual environment within the second user interface, receive a request to change an aspect of the avatar as displayed within the second user interface on the second display, the aspect of the avatar (i) being defined by a first value of an attribute in the stream of data and (ii) including a size of the avatar within the virtual environment; and
in response to receiving the request, perform a transformation on the stream of data received over the network, the transformation (i) changing the value of the size of the avatar from the first value to a second value as the stream of data is received and (ii) maintaining a spatial position of the object within the virtual environment relative to the avatar when the aspect of the avatar is described by the first value of the attribute, including preserving the path determined by the interaction of the first user with the object as viewed by the second user on the second display in response to the value of the size of the avatar being changed from the first value to a second value as the stream of data is received, data representing the object after the changing of the value of the attribute of the avatar remaining the same as the data representing the object prior to the changing of the value of the attribute of the avatar.

14. An electronic apparatus as in claim 13, wherein the avatar is a first avatar;
wherein the virtual environment further includes a second avatar representing the second user within the virtual environment; and
wherein the controlling circuitry configured to change the height of the avatar as displayed within the second user interface on the second display from a first value to a second value is further configured to reduce the size of the first avatar to a height no greater than a height of the second avatar.

15. An electronic apparatus as in claim 13, wherein the aspect of the avatar as displayed within the second user interface on the second display includes outerwear worn by the avatar within the virtual environment; and
wherein the controlling circuitry configured to perform the transformation on the stream of data received over the network includes is further configured to change the facial feature of the avatar displayed within the second user interface on the second display.

16. An electronic apparatus as in claim 13, wherein the aspect of the avatar as displayed within the second user interface on the second display includes outerwear worn by the avatar within the virtual environment; and
wherein the controlling circuitry configured to change the value of the second attribute of the avatar from the first value to the second value is further configured to change the outerwear worn by the avatar displayed within the second user interface on the second display.

17. An electronic apparatus as in claim 13, wherein the controlling circuitry is further configured to:
receive a first request from the first user to generate a virtual mirror within the virtual environment, the virtual mirror being configured to display an image of the avatar on the first display within the first user interface;
in response to receiving the request, adjust the stream of data received over the network to produce the virtual mirror, and
wherein the controlling circuitry configured to receive the request to change the aspect of the avatar as displayed within the second user interface on the second display is further configured to, after adjusting the stream of data received over the network to produce the virtual mirror, receive a second request from the first user to change the aspect of the avatar.

* * * * *

UNITED STATES PATENT AND TRADEMARK OFFICE
CERTIFICATE OF CORRECTION

Page 1 of 1

PATENT NO. : 10,636,222 B2
APPLICATION NO. : 15/586628
DATED : April 28, 2020
INVENTOR(S) : Clement et al.

It is certified that error appears in the above-identified patent and that said Letters Patent is hereby corrected as shown below:

In the Claims

In Column 26, Claim 8, Lines 15-16, delete "non-transitive" and insert -- non-transitory --, therefor.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*